(12) United States Patent
Yang et al.

(10) Patent No.: US 12,117,916 B2
(45) Date of Patent: Oct. 15, 2024

(54) METHOD, APPARATUS, DEVICE, AND STORAGE MEDIUM FOR GRAPHICALLY DISPLAYING APPLICATION PERFORMANCE MANAGEMENT INFORMATION

(71) Applicant: Alibaba Group Holding Limited, Grand Cayman (KY)

(72) Inventors: Yi Yang, Hangzhou (CN); Yao Cheng, Hangzhou (CN); Jun Feng, Hangzhou (CN); Tong Xu, Hangzhou (CN)

(73) Assignee: Alibaba Group Holding Limited, George Town (KY)

( * ) Notice: Subject to any disclaimer, the term of this patent is extended or adjusted under 35 U.S.C. 154(b) by 342 days.

(21) Appl. No.: 17/345,710

(22) Filed: Jun. 11, 2021

(65) Prior Publication Data

US 2021/0303434 A1 Sep. 30, 2021

Related U.S. Application Data

(63) Continuation of application No. PCT/CN2019/125855, filed on Dec. 17, 2019.

(30) Foreign Application Priority Data

Dec. 28, 2018 (CN) .......................... 201811626387.6

(51) Int. Cl.
*G06F 11/32* (2006.01)
*G06F 11/34* (2006.01)

(52) U.S. Cl.
CPC .......... *G06F 11/324* (2013.01); *G06F 11/323* (2013.01); *G06F 11/3495* (2013.01)

(58) Field of Classification Search
CPC .. G06F 11/324; G06F 11/323; G06F 11/3495; G06F 11/3409; G06F 11/302;
(Continued)

(56) References Cited

U.S. PATENT DOCUMENTS 6,381,635 B1 4/2002 Hoyer
7,779,362 B1 * 8/2010 Castrucci ............ G06F 3/04842
715/765

(Continued)

FOREIGN PATENT DOCUMENTS

CN 104298439 A 1/2015
CN 105683942 A 6/2016
(Continued)

OTHER PUBLICATIONS

Extended European Search Report mailed Aug. 8, 2022 for European Patent Application No. 19905127.7, 10 pages.
(Continued)

*Primary Examiner* — John T Repsher, III
(74) *Attorney, Agent, or Firm* — Lee & Hayes, P.C.

(57) ABSTRACT

A method, an apparatus, a device, and a storage medium for displaying application performance management information are provided. The method includes: separately obtaining first and second performance status information of services provided by a first application and a second application; determining first and second display specifications of respective graphics corresponding to the first and second performance status information, to enable a ratio of the first display specification to the second display specification to be not greater than a preset value; and displaying the respective graphics corresponding to the first and second performance status information according to the determined first and second display specifications.

16 Claims, 10 Drawing Sheets

(58) Field of Classification Search
CPC ... G06F 16/904; H04L 41/5009; H04L 41/22; H04L 43/045
See application file for complete search history.

(56) References Cited

U.S. PATENT DOCUMENTS

| | | | |
|---|---|---|---|
| 8,443,287 | B2 | 5/2013 | Gooding et al. |
| 9,594,665 | B2 | 3/2017 | Baril et al. |
| 9,647,909 | B2 | 5/2017 | Kuan et al. |
| 9,800,470 | B2 | 10/2017 | Agarwal et al. |
| 10,114,727 | B2 | 10/2018 | Lindo et al. |
| 10,515,000 | B2 | 12/2019 | Moretto et al. |
| 10,693,743 | B2 | 6/2020 | Zhong et al. |
| 10,749,939 | B2 | 8/2020 | Moon et al. |
| 2005/0248588 | A1 | 11/2005 | Freeman |
| 2006/0123022 | A1* | 6/2006 | Bird ............... G06Q 10/063 |
| 2009/0235267 | A1* | 9/2009 | McKinney ......... G06F 11/328 718/104 |
| 2011/0148881 | A1 | 6/2011 | Kageyama |
| 2014/0033055 | A1* | 1/2014 | Gardner ......... G06F 11/3409 715/736 |
| 2014/0201642 | A1 | 7/2014 | Vicat-Blanc |
| 2015/0301861 | A1* | 10/2015 | LaChiusa ............ G06F 9/54 718/102 |
| 2018/0165254 | A1* | 6/2018 | Talati ............... G06F 40/18 |
| 2018/0165844 | A1 | 6/2018 | Kirichenko |
| 2018/0253373 | A1* | 9/2018 | Mathur ........... G06F 11/3404 |
| 2018/0309637 | A1 | 10/2018 | Gill et al. |

FOREIGN PATENT DOCUMENTS

| | | |
|---|---|---|
| CN | 106446074 A | 2/2017 |
| CN | 107544722 A | 1/2018 |
| CN | 108804437 A | 11/2018 |

OTHER PUBLICATIONS

International Search Report dated Mar. 18, 2020, from corresponding PCT Application No. PCT/CN2019/125855, 2 pages.
Written Opinion dated Mar. 18, 2020, from corresponding PCT Application No. PCT/CN2019/125855, 4 pages,.

* cited by examiner

METHOD, APPARATUS, DEVICE, AND STORAGE MEDIUM FOR GRAPHICALLY DISPLAYING APPLICATION PERFORMANCE MANAGEMENT INFORMATION

CROSS REFERENCE TO RELATED PATENT APPLICATIONS

This application claims priority to and is a continuation of PCT Patent Application No. PCT/CN2019/125855 filed on 17 Dec. 2019, and is related to and claims priority to Chinese Application No. 201811626387.6, filed on 28 Dec. 2018 and entitled "Application Performance Management Information Display Method and Apparatus, Device and Storage Medium," which are hereby incorporated by reference in their entirety.

TECHNICAL FIELD

The present disclosure relates to the field of terminal technology, and particularly to application performance management information display methods, apparatuses, devices and storage media.

BACKGROUND

With the rapid development of cloud computing technology, an increasing number of applications are deployed in the cloud. In order to ensure reliable operation of applications in the cloud, related technologies provide data visualization technology, i.e., visually displaying various types of data that are running in the cloud, so that users can intuitively understand various types of parameters or status information of running applications.

SUMMARY

This Summary is provided to introduce a selection of concepts in a simplified form that are further described below in the Detailed Description. This Summary is not intended to identify all key features or essential features of the claimed subject matter, nor is it intended to be used alone as an aid in determining the scope of the claimed subject matter. The term "techniques," for instance, may refer to device(s), system(s), method(s) and/or processor-readable/computer-readable instructions as permitted by the context above and throughout the present disclosure.

In view of this, one or more embodiments of the present disclosure provide a method, an apparatus, a device, and a storage medium for displaying application performance management information.

To achieve the foregoing objectives, one or more embodiments of the present disclosure provide technical solutions as follows:

According to one or more embodiments of the present disclosure, a method for displaying application performance management information is proposed, and includes:
  separately obtaining first and second performance status information of services provided by a first application and a second application;
  determining first and second display specifications of respective graphics corresponding to the first and second performance status information, to enable a ratio of the first display specification to the second display specification to be not greater than a preset value; and
  displaying the respective graphics corresponding to the first and second performance status information according to the determined first and second display specifications.

According to one or more embodiments of the present disclosure, a method for displaying application performance management information is proposed, and includes:
  displaying a first graphic and a second graphic on a terminal device, the first graphic corresponding to first performance status information of a first application, and the second graphic corresponding to second performance status information of a second application; and
  switching between a first display mode and a second display mode according to a user's input to adjust an association relationship between first and second display specifications corresponding to the first graphic and the second graphic.

According to one or more embodiments of the present disclosure, a display apparatus for application performance management information is proposed, and includes:
  an acquisition unit that separately obtains first and second performance status information of services provided by a first application and a second application;
  a determination unit that determines first and second display specifications of respective graphics corresponding to the first and second performance status information, to enable a ratio of the first display specification to the second display specification to be not greater than a preset value; and
  a display unit that displays the respective graphics corresponding to the first and second performance status information according to the determined first and second display specifications.

According to one or more embodiments of the present disclosure, a display device for application performance management information is proposed, and includes:
  a display unit that displays a first graphic and a second graphic on a terminal device, the first graphic corresponding to first performance status information of a first application, and the second graphic corresponding to second performance status information of a second application; and
  a switching unit that switches between a first display mode and a second display mode according to a user's input to adjust an association relationship between first and second display specifications corresponding to the first graphic and the second graphic.

According to one or more embodiments of the present disclosure, an electronic device is proposed, and includes:
  a processor;
  a memory used for storing processor executable instructions;
  wherein the processor implements the method according to the first aspect by running the executable instructions.

According to one or more embodiments of the present disclosure, an electronic device is proposed, and includes:
  a processor;
  a memory for storing processor executable instructions;
  wherein the processor implements the method according to the second aspect by running the executable instruction.

According to one or more embodiments of the present specification, a computer-readable storage medium is provided, and computer instructions are stored thereon. The instructions, when executed by a processor, implement the steps of the method described in the first aspect.

According to one or more embodiments of the present specification, a computer-readable storage medium is provided, and computer instructions are stored thereon. The instructions, when executed by a processor, implement the steps of the method described in the second aspect.

DETAILED DESCRIPTION

Exemplary embodiments are described in detail herein, and examples thereof are shown in the accompanying drawings. When the drawings are referred in the following description, the same numbers in different drawings indicate the same or similar elements unless indicated otherwise. Implementations described in the following exemplary embodiments do not represent all implementations that are consistent with one or more embodiments of the present disclosure. Rather, they are merely examples of apparatuses and methods that are consistent with some aspects of one or more embodiments of the present disclosure as described in detail in the appended claims.

It should be noted that in other embodiments, steps of a corresponding method may not be executed in an order as shown and described in the present disclosure. In some other embodiments, a method may include more or fewer steps than those described in the present disclosure. In addition, a single step described in the present disclosure may be decomposed into multiple steps for description in other embodiments, and multiple steps described in the present disclosure may also be combined into a single step in other embodiments.

In implementations, the display solutions of the present disclosure can be applied to electronic devices. For example, the electronic devices may include PCs, tablet devices, notebook computers, PDAs (Personal Digital Assistants), mobile phones, and wearable devices (such as smart glasses, smart watches, etc.), etc., which are not limited by one or more embodiments of the present disclosure. During operation, such electronic device can run a data visualization display system to achieve the purpose of displaying data visualization and complete the display solutions in the present disclosure. An application program of such display system can be pre-installed on the electronic device, so that the display system can be started and run on the electronic device. Apparently, when technology such as HTML5 is used, the display system can be obtained and run without the need of installing a corresponding application program on the electronic device.

Figure 1:
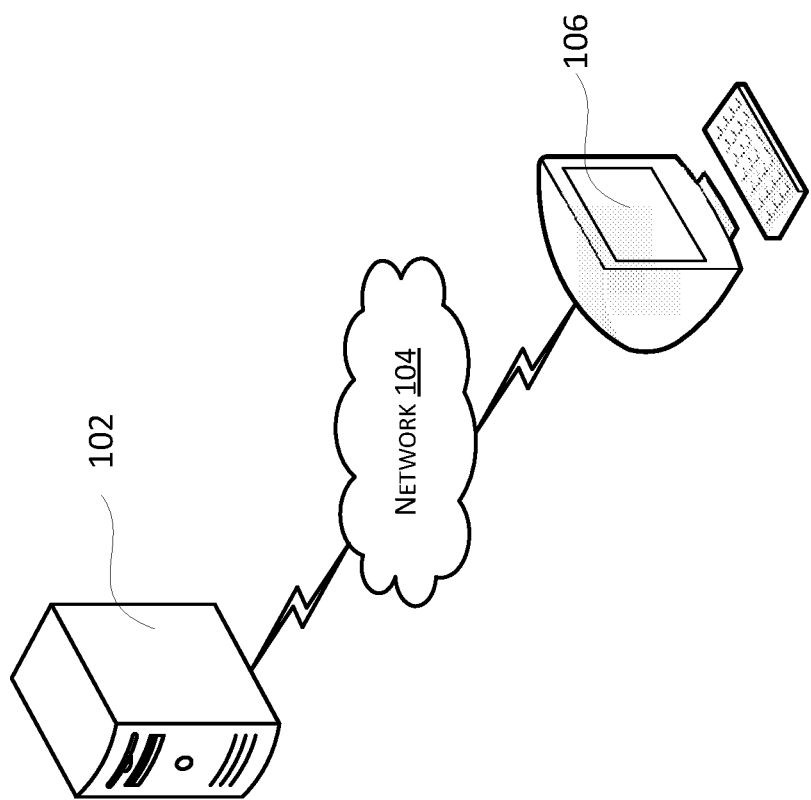
FIG. 1 is a schematic structural diagram of a display system provided by an exemplary embodiment.

In implementations, the data visualization display system may include a server 102, a network 104, and an electronic device 106 as shown in FIG. 1. The server 102 can run programs on the server side of the display system to realize related functions such as data processing, etc., during a running process, and the electronic device 106 can run programs on the client side of the display system during the running process, in order to realize related functions such as display, human-computer interactions, etc. The server 102 and the electronic device 106 cooperate to implement the data visualization display solutions.

The server 102 may be a physical server including an independent host, or the server 102 may be a virtual server carried by a host cluster. The electronic device 106 can use any of the following types of devices: PCs, tablet devices, notebook computers, PDAs (Personal Digital Assistants), mobile phones, wearable devices (such as smart glasses, smart watches, etc.), etc., which are not limited by one or more of the present disclosure. A network 104 through which the electronic device 106 and the server 102 conduct interactions may include multiple types of wired or wireless networks. In implementations, the network 104 may include a public switched telephone network (PSTN) and the Internet. An application program of a client of the display system may be pre-installed on an electronic device, so that the client can be started and run on the electronic device. Apparently, when an online "client" such as HTML5 technology is used, the client can be obtained and run on the electronic device without the need of installing a corresponding application program.

Figure 2A:
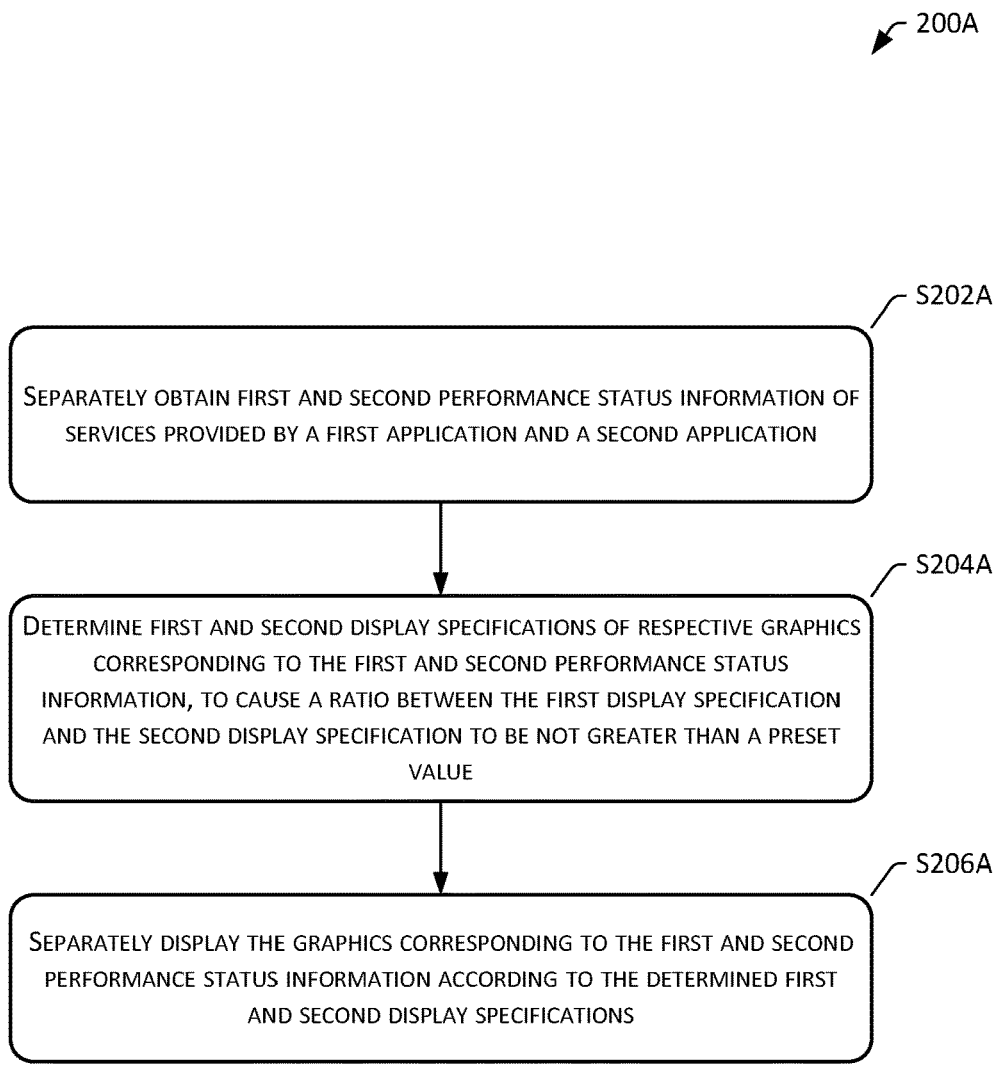
FIG. 2A is a flowchart of a method for displaying application performance management information according to an exemplary embodiment.

FIG. 2A is a flowchart of a method 200A for displaying application performance management information according to an exemplary embodiment. As shown in FIG. 2A, the method 200A may include the following steps:

Step 202A: Separately obtain first and second performance status information of services provided by a first application and a second application.

In implementations, an application in the present disclosure may include a back-end application that runs based on a specific package in back-end architecture. For example, the application may include a general-purpose middleware application, or may include a non-general-purpose application related to service scenarios, which are not limited by the present disclosure.

In implementations, each application can provide a corresponding service. These services can be called, and performance status information can reflect a performance status of a related application, so as to implement a corresponding application performance management (APM) task. For example, the performance status information may include: a number of service calls, a number of errors, an average duration for each call, etc., which are not limited by the present disclosure.

Step 204A: Determine first and second display specifications of respective graphics corresponding to the first and second performance status information, to cause a ratio between the first display specification and the second display specification to be not greater than a preset value.

In implementations, by setting a ratio between the first display specification and the second display specification to be not greater than a preset value, a reasonable setting of display specifications of first and second graphics is realized, and an excessive difference in specifications between the first and second graphics that are simultaneously displayed can be avoided. This thus not only reflects performance statuses corresponding to different services, but also facilitates users to view and distinguish, and prevents graphics with smaller display specifications from being difficult for the users to view.

In implementations, the display specifications of the graphics are positively correlated with values of the performance status information of the corresponding services, so that a user can quickly distinguish the performance statuses of the corresponding services based on the specifications of different graphics.

In implementations, when the ratio between the values of the first and second performance status information is greater than the preset value, exponential reduction may be performed on the values of the first and second performance status information according to a dynamic factor, to make the ratio between the values of the processed first and second performance status information to be not greater than the preset value. The first and second display specifications are confirmed to be in a positive proportional relationship with the values of the processed first and second performance status information, in order to ensure that a ratio between the first display specification and the second display specification is not greater than a predetermined value, while maintaining a size relationship between the values of the first and second performance status information of the services corresponding to the first and second graphics, thus facilitating a user to quickly distinguish the performance statuses of different services based on the specifications of the graphics.

For example, the dynamic factor can be determined by the following formula: $a = \log b / \log(Max/Min)$, where $a$ is the dynamic factor, $b$ is the preset value, and Max is the larger value of the first and second performance status information, Min is the smaller value of the first and second performance status information. As such, in order to ensure that the value of the dynamic factor a is taken between 0 and 1 when Max/Min>b. Therefore, the difference between the values of the first and second performance state information is finally reduced. Apparently, the value of the dynamic factor can also be calculated in other ways, which is not limited by the present disclosure. For example, dynamic factors corresponding to different numerical value intervals can be preset, and a corresponding value of the dynamic factor can be selected according to a numerical value interval in which a ratio between the larger value and the smaller value of the first and second performance status information is located.

In implementations, when the ratio between the larger value and the smaller value of the first and second performance status information is not greater than the preset value, a determination can be made that the first and second display specifications are in a positive proportional relationship with the values of the first and second performance status information, As such, the ratio between the larger display specification and the smaller display specification in the first and second display specifications is ensured to be not greater than the preset value, while a size relationship between the values of the performance status information of the graphics of services corresponding to the first and second display specifications can be retained. This helps a user to quickly distinguish the performance statuses of different services based on the specifications of the graphics.

In implementations, a corresponding display specification can be adopted according to shapes adopted by graphics to intuitively show performance status information of a service corresponding to each graphic. For example, when the graphics are a two-dimensional graphic, the first and second display specifications may include the areas of the two-dimensional graphics. When the graphics are three-dimensional graphics, the first and second display specifications may include the volumes of the three-dimensional graphics.

In implementations, the "first application" and the "second application" are used to distinguish different applications. For example, when comparing any two applications, one of them can be regarded as the "first application", and the other as the "second application". However, three or more applications may exist, which are not limited in the present disclosure. Correspondingly, the situations for "first performance status information" and "second performance status information", "first graphic" and "second graphic", "first display specification" and "second display specification" are similar, which are not repeated herein.

Step 206A: Separately display the graphics corresponding to the first and second performance status information according to the determined first and second display specifications.

In implementations, by separately displaying the graphics corresponding to the first and second performance status information, for example, adjacently or closely displaying these graphics, the users can compare each other and intuitively determine sizes of the display specifications of each graphic when viewing, thus determining the performance statuses of the corresponding services.

In implementations, when any graphic is selected, the value of the performance status information corresponding to the graphic can be displayed. This is especially convenient for the users to accurately know a value of performance status information corresponding to a graphic when a display specification of the graphic is not in a proportional relationship with the performance status information.

Figure 2B:
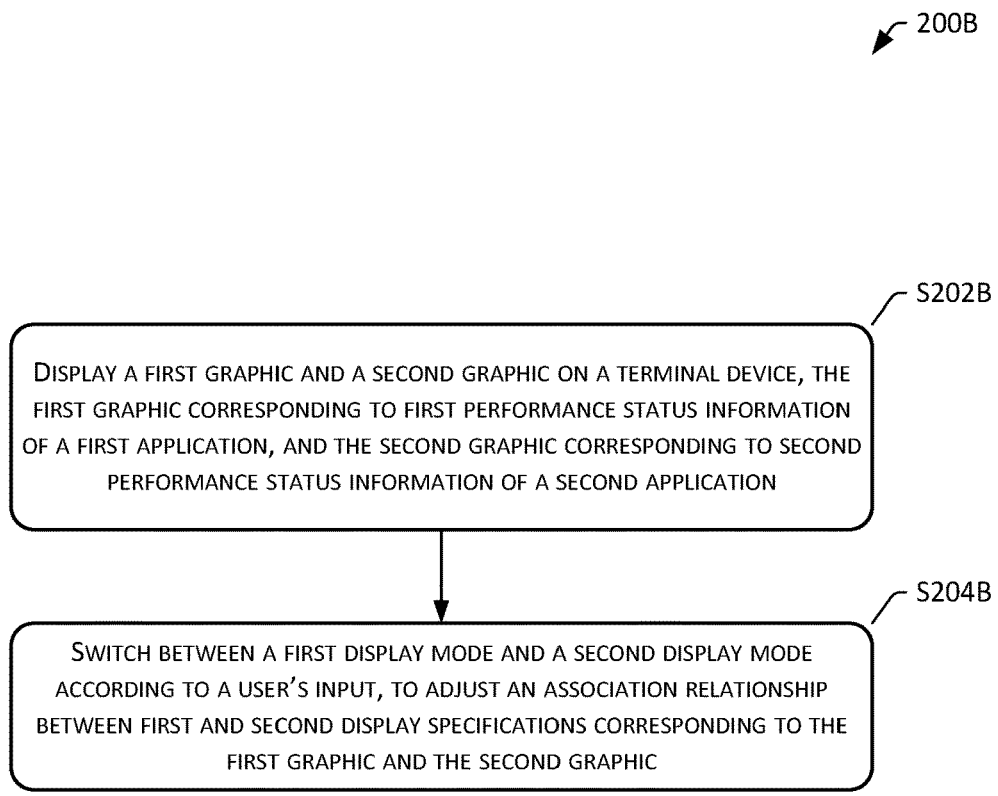
FIG. 2B is a flowchart of another method for displaying application performance management information according to an exemplary embodiment.

FIG. 2B is a flowchart of another method 200B for displaying application performance management information according to an exemplary embodiment. As shown in FIG. 2B, the method 200B may include the following steps:

Step 202B: Display a first graphic and a second graphic on a terminal device, the first graphic corresponding to first performance status information of a first application, and the second graphic corresponding to second performance status information of a second application.

In implementations, an application in the present disclosure may include a back-end application that runs based on a specific package in back-end architecture. For example, the application may include a general-purpose middleware application, or may include a non-general-purpose application related to service scenarios, which are not limited by the present disclosure.

In implementations, each application can provide a corresponding service. These services can be called, and performance status information can reflect a performance status of a related application, so as to implement a corresponding application performance management task. For example, the performance status information may include: a number of service calls, a number of errors, an average duration for each call, etc., which are not limited by the present disclosure.

Step 204B: Switch between a first display mode and a second display mode according to a user's input, to adjust an association relationship between first and second display specifications corresponding to the first graphic and the second graphic.

In implementations, the terminal device can obtain a user's input, and switch or configure an adopted display mode accordingly. In other words, the user can actively adjust a desired display mode to meet his/her actual needs. The "first display mode" and the "second display mode" are used to distinguish different display modes. For example, when comparing any two display modes, one of them can be regarded as the "first display mode" and the other can be referred to as the "second display mode". In practice, three or more display modes may exist, which are not limited by the present disclosure.

In implementations, in the first display mode, values of the first and second display specifications may be in a positive proportional relationship with the first and second performance status information. In the second display mode, the values of the first and second performance status information are exponentially reduced according to a dynamic factor, so that a ratio between the values of the processed first and second performance status information is not greater than an expected value, and the first and second display specifications have a positive proportional relationship with the processed first and second performance status information.

In particular, when the ratio between the values of the first and second performance status information is greater than the preset value, a difference between the values of the first and second performance status information can be reduced by adopting the second display mode, in order to ensure that a ratio between the first display specification and the second display specification is not greater than a predetermined value, while maintaining a size relationship between the values of the first and second performance status information of services corresponding to the first and second graphics, thus helping the users to quickly distinguish the performance status of different services based on the specifications of the graphics.

For example, the dynamic factor can be determined by the following formula: a=Log b/Log(Max/Min), where a is the dynamic factor, b is the preset value, and Max is the larger value of the first and second performance status information, Min is the smaller value of the first and second performance status information. As such, in order to ensure that the value of the dynamic factor a is taken between 0 and 1 when Max/Min>b. Therefore, the difference between the values of the first and second performance state information is finally reduced. Apparently, the value of the dynamic factor can also be calculated in other ways, which is not limited by the present disclosure. For example, dynamic factors corresponding to different numerical value intervals can be preset, and a corresponding value of the dynamic factor can be selected according to a numerical value interval in which a ratio between the larger value and the smaller value of the first and second performance status information is located.

In implementations, a corresponding display specification can be adopted according to shapes adopted by graphics to intuitively show performance status information of a service corresponding to each graphic. For example, when the graphics are a two-dimensional graphic, the first and second display specifications may include the areas of the two-dimensional graphics. When the graphics are three-dimensional graphics, the first and second display specifications may include the volumes of the three-dimensional graphics.

In implementations, by separately displaying the graphics corresponding to the first and second performance status information, for example, adjacently or closely displaying these graphics, the users can compare each other and intuitively determine sizes of the display specifications of each graphic when viewing, thus determining the performance statuses of the corresponding services.

In implementations, when any graphic is selected, the value of the performance status information corresponding to the graphic can be displayed. This is especially convenient for the users to accurately know a value of performance status information corresponding to a graphic when a display specification of the graphic is not in a proportional relationship with the performance status information.

For ease of understanding, take the number of service calls in the APM scenario as an example to illustrate how to reasonably display the number of service calls of different services under the technical solution of the present disclosure.

Figure 3:
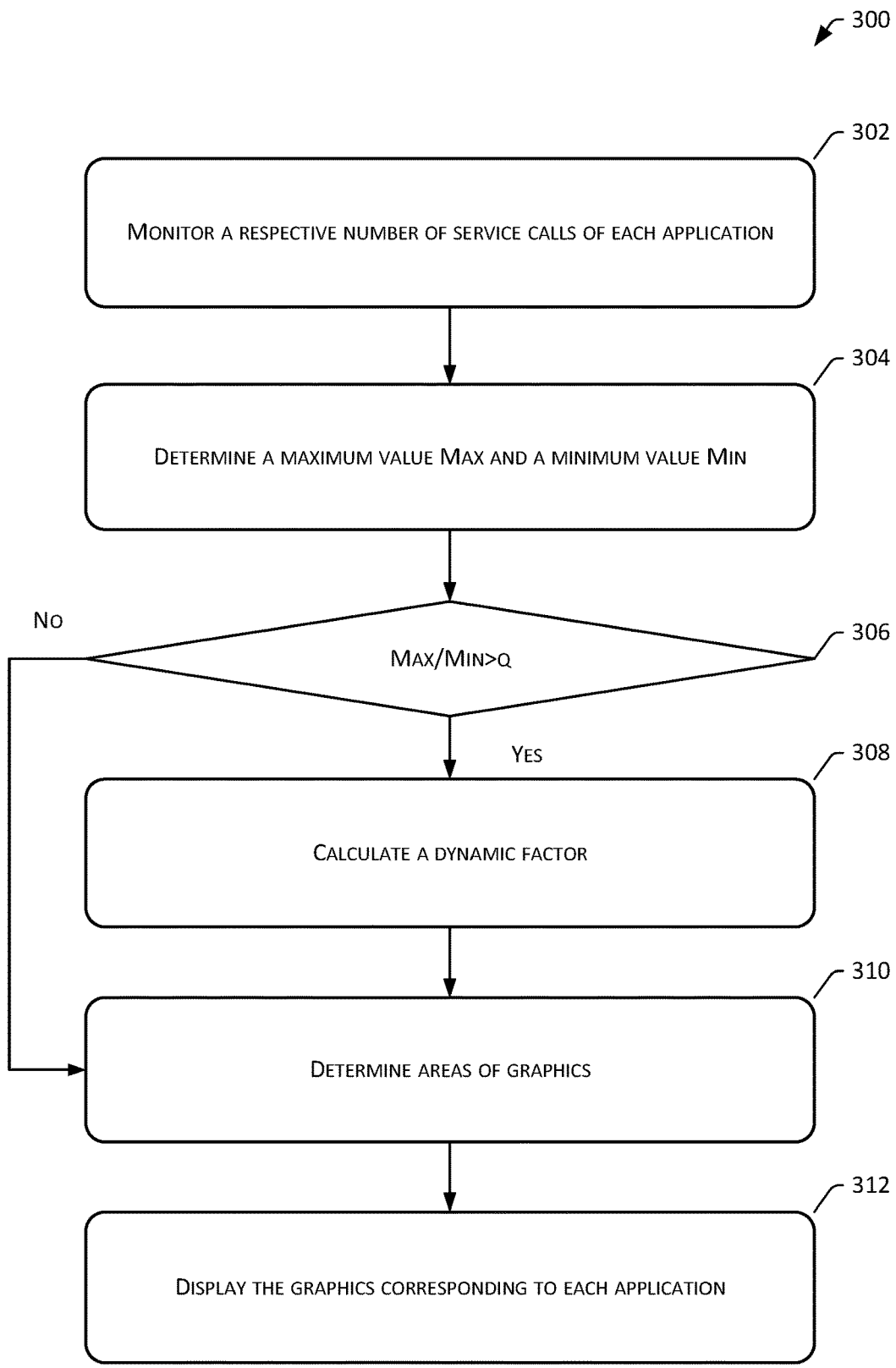
FIG. 3 is a flowchart of visually displaying the number of service invocations provided by an exemplary embodiment.

FIG. 3 is a flowchart 300 of visually displaying the number of service invocations provided by an exemplary embodiment. As shown in FIG. 3, a flowchart 300 of such processing flow may include the following steps:

Step 302: Monitor a respective number of service calls of each application.

In implementations, each application can provide a corresponding service, and each application can implement mutual invocation of services, thereby implementing related functions. Therefore, the number of times each service is called can be counted to obtain a corresponding number of service calls. For example, when service 1 is called 100 times, a corresponding number of service calls is 100, and when service 2 is called once, a corresponding number of service calls is 1.

Figure 4:
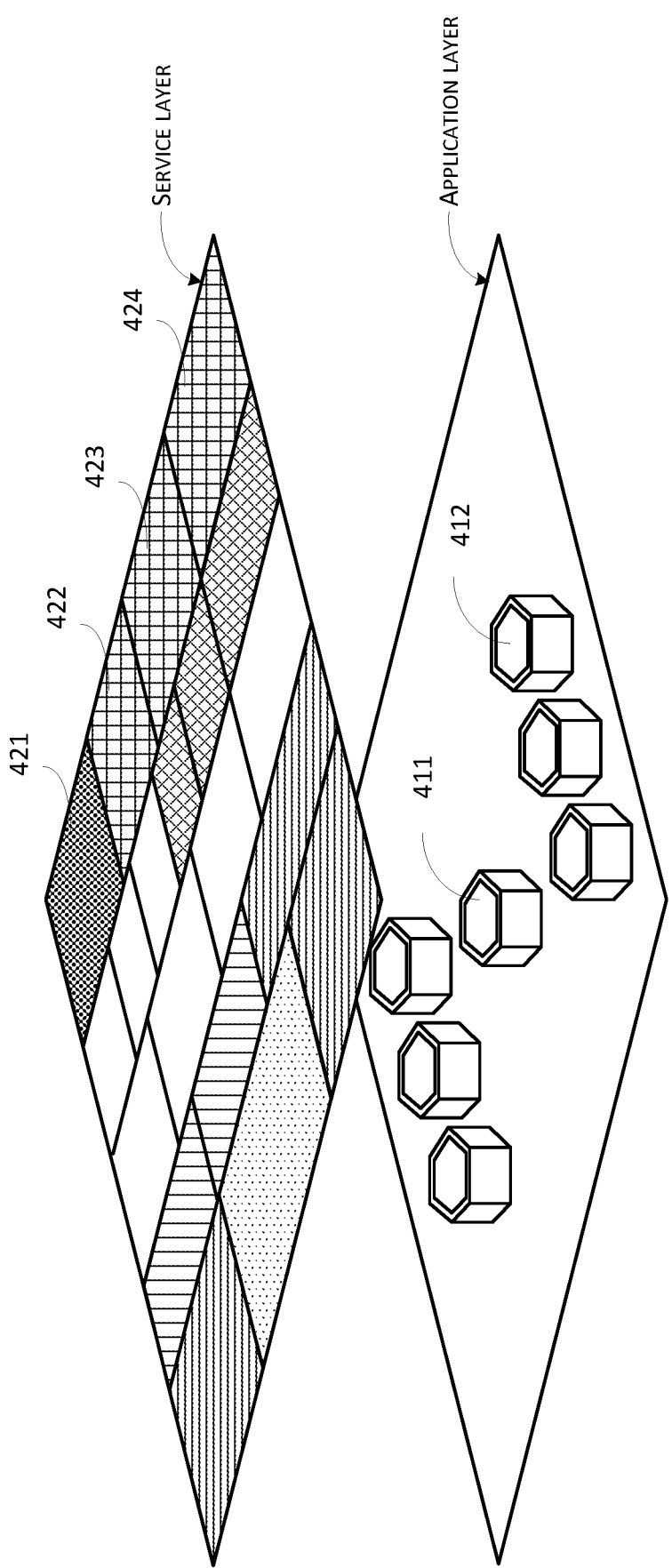
FIG. 4 is a schematic diagram of an interface for data visualization based on a hierarchical structure provided by an exemplary embodiment.

For example, FIG. 4 is a schematic diagram of an interface for data visualization based on a hierarchical structure provided by an exemplary embodiment. As shown in FIG. 4, the interface may include an upper layer corresponding to a service layer and a lower layer corresponding to an application layer. Apparently, in other embodiments, the service layer may be displayed in the lower layer and the application layer may be displayed in the upper layer. The present disclosure does not have any limitation thereon. The application layer is used to display a topological relationship between a number of applications through visualization nodes 411-412, and the service layer is used to display various services provided by applications through graphics 421-424. Respective numbers of service calls of related services are shown through areas of graphics 421-424, and respective degrees of health of the related services are illustrated through colors of graphics 421-424, so that users can view from different dimensions.

Step 304: Determine a maximum value Max and a minimum value Min.

In implementations, for all the monitored applications, a maximum value Max and a minimum value Min may be determined according to values of respective numbers of service calls corresponding to these applications. For example, if application 1 to application 4 exist, where the number of service calls corresponding to application 1 is 10000, the number of service calls corresponding to application 2 is 400, the number of service calls corresponding to application 3 is 81, and the number of service calls corresponding to application 4 is 1, then the maximum value Max=10000 and the minimum value Min=1 can be determined.

Step 306: Calculate Max/Min (i.e., divide Max by Min), and determine a size relationship between a calculation result and a preset value q; when Max/Min>q, go to step 308, and otherwise go to step 310.

In implementations, when performing data visualization processing for the number of service calls, an area of a corresponding graphic can be set according to a value of the number of service calls, so that a size of the area of the graphic can intuitively reflect the value of the number of service calls. Therefore, an optional way is to make a ratio between areas of graphics to be equal to a ratio between values of the numbers of service calls.

Figure 5:
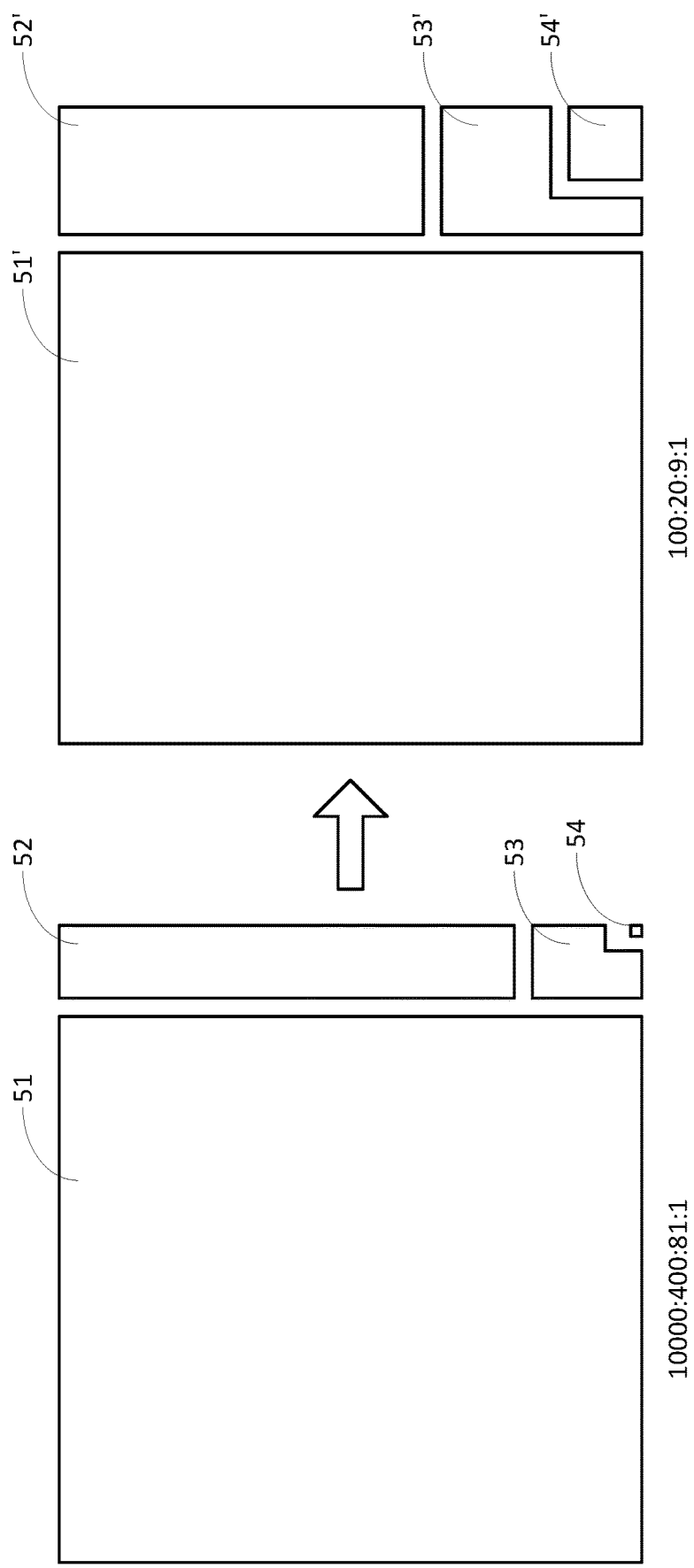
FIG. 5 is a schematic diagram of visually displaying the number of service invocations provided by an exemplary embodiment.

Therefore, when the value of Max/Min is greater than q, this indicates that the values of the number of service calls are very different, and the sizes of the areas of the corresponding graphics are also very different. For example, if application 1 to application 4 exist, where the number of service calls corresponding to application 1 is 10000, the number of service calls corresponding to application 2 is 400, the number of service calls corresponding to application 3 is 81, and the number of service calls corresponding to application 4 is 1, then Max/Min=10000/1=10000. If corresponding graphics are directly formed, a form such as that on the left side of FIG. 5 can be presented: respective numbers of service calls of application 1 to application 4 correspond to graphics 51 to 54, and a ratio between areas of graphics 51, 52, 53 and 54 is 10000:400:81:1. Due to the limited screen specifications of electronic devices, an area of a display area provided under a same zoom ratio is fixed. When an area ratio is too large, it is easy to cause small-area graphics such as graphic 54 to be difficult to be viewed or even to be very easy to be ignored. This is not conducive to a user to intuitively know a value of a respective number of service calls corresponding to each application.

For the preset value q, the value of the preset value q can be determined according to an actual situation, which is not limited by the present disclosure. For example, q=100 can be set.

Step 308: Calculate a dynamic factor.

In implementations, in view of a large difference between the areas of the graphics, a dynamic factor can be calculated, and the values of the numbers of service calls can be processed based on the dynamic factor, so as to reduce the difference between the values of the numbers of service calls, thereby improving the problem of the areas of the graphics being too different.

For example, when q=100, the dynamic factor can be calculated according to the following formula:

$$a = \text{Log}\,100/\text{Log}(\text{Max}/\text{Min})$$

a is the dynamic factor, Max is the above-mentioned maximum value, and Min is the above-mentioned minimum value. Therefore, when Max/Min>100, the value of a can be between 0 and 1. For example, when Max=10000, Min=1, and when a base 10 logarithmic operation is performed, a=Log 100/Log(10000/1)=2/4=0.5.

Step 310: Determine areas of graphics.

Step 312: Display the graphics corresponding to each application.

In implementations, when Max/Min>q, an area of a graphic can be determined according to the dynamic factor calculated above. The above application 1 to application 4 is still used as an example. If the numbers of service calls are 10000, 400, 81, and 1 respectively, and the dynamic factor a=0.5, then a ratio of the areas of the corresponding graphics can be determined to be $10000^{0.5}:400^{0.5}:81^{0.5}:1^{0.5}=100:20:9:1$. Therefore, the displayed graphics can be changed from the graphics 51 to 54 as shown on the left side of FIG. 5 to the graphics 51' to 54' as shown on the right side of FIG. 5.

As can be clearly seen, under a condition that an area of an occupied display area remained unchanged, the graphic 54' is easier to be viewed as compared to the graphic 54, and it is still possible to intuitively determine size relationships between and degrees of difference between the numbers of corresponding service calls based on respective areas of the graphic 51', the graphic 52', the graphic 53', and the graphic 54'.

In implementations, when Max/Min q, a ratio of the areas of the graphics can be made to be equal to the ratio of the numbers of service calls. For example, when the numbers of service calls of application 1 to application 4 are 100, 20, 9, and 1, since Max/Min=100/1=100=q, the corresponding graphics can be directly displayed as the graphic 51' to the graphic 54' as shown on the right side of FIG. 5.

In implementations, different display modes can be provided to the user. For example, in the first display mode, the graphics 51 to 54 as shown on the left side of FIG. 5 can be displayed, and in the second display mode, the graphics 51' to 54' as shown on the right side of FIG. 5 can be displayed, thus allowing the user to switch according to actual needs. The electronic device can correspondingly display the graphics 51 to 54 as shown on the left side of FIG. 5 or the graphics 51' to 54' as shown on the right side of FIG. 5.

Figure 6:
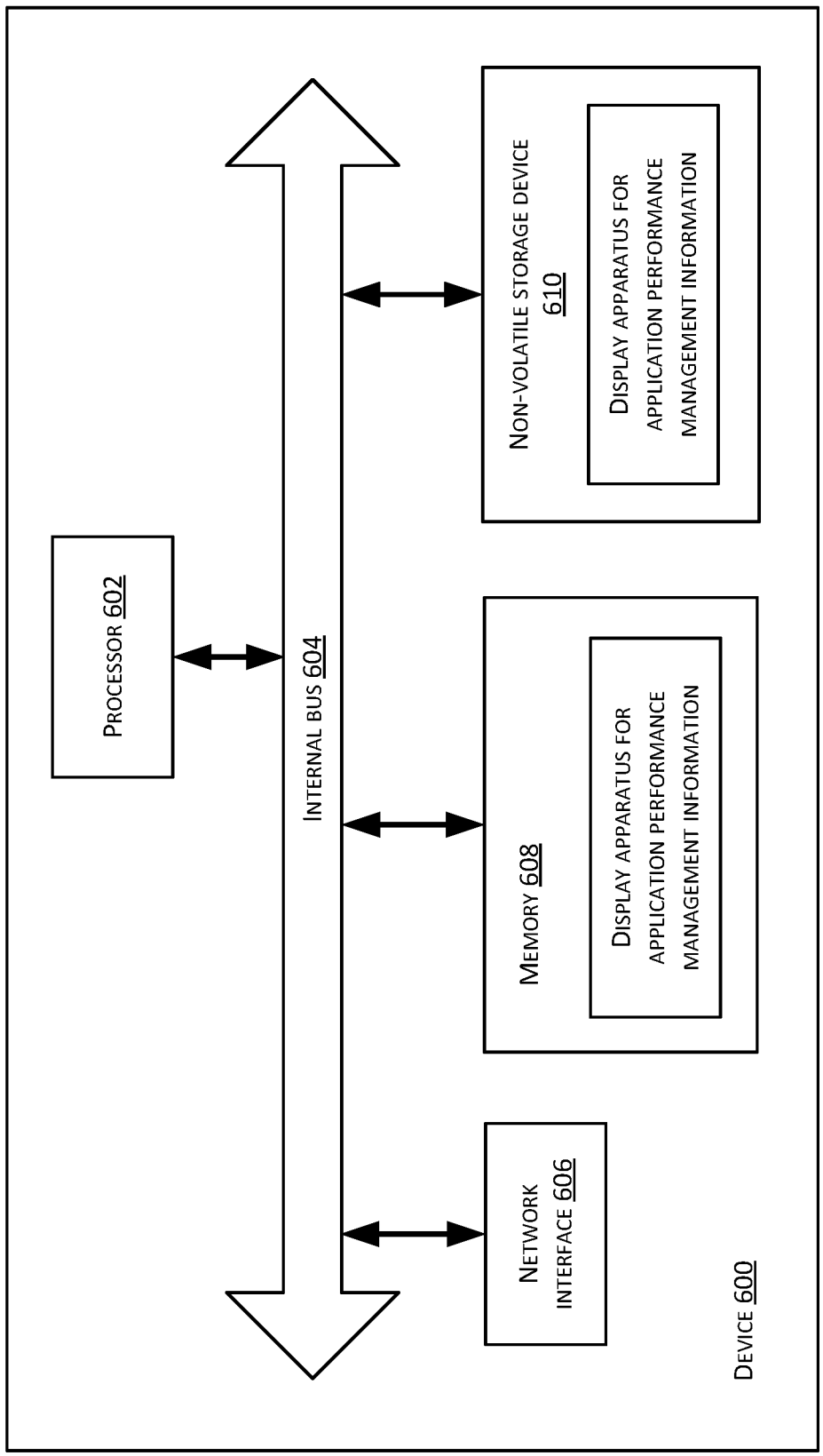
FIG. 6 is a schematic structural diagram of a device provided by an exemplary embodiment.

FIG. 6 is a schematic structural diagram of a device 600 provided by an exemplary embodiment. Referring to FIG. 6, at the hardware level, the device includes a processor 602, an internal bus 604, a network interface 606, a memory 608, and a non-volatile storage device 610. Apparently, hardware needed by other services may also be included. The processor 602 reads a corresponding computer program from the non-volatile storage device 610 to the memory 608, and then runs it to form a display apparatus for application performance management information on a logical level. Apparently, in addition to software implementations, one or more embodiments of the present disclosure do not exclude other implementations, such as logic devices or a combination of software and hardware, etc. In other words, an execution body of the following processing flow is not limited to various logic units, and may also be hardware or a logic device.

Figure 7:
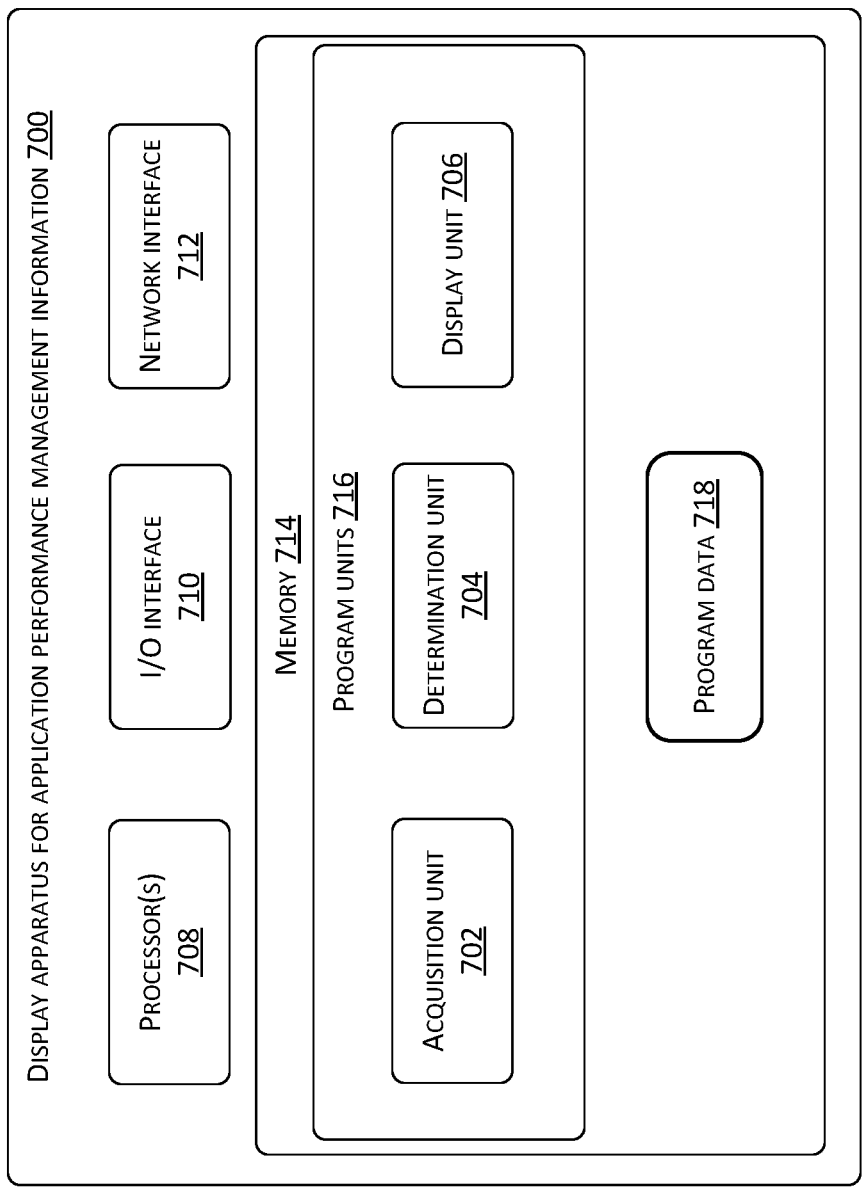
FIG. 7 is a block diagram of an apparatus for displaying application performance management information provided by an exemplary embodiment.

Referring to FIG. 7, in software implementations, a display apparatus 700 for application performance management information may include:

an acquisition unit 702 that separately obtains performance status information of services provided by multiple applications;

a determination unit 704 that determines display specifications of graphics corresponding to each performance status information, to cause a ratio between a maximum display specification and a minimum display specification to be not greater than a preset value; and a display unit 706 that displays the graphics corresponding to each performance status information according to the determined display specifications.

In implementations, the determination unit 704 is specifically configured to:

perform exponential reduction processing on values of each performance status information according to a same dynamic factor when a ratio between a maximum value and a minimum value of the performance status information is greater than the predetermined value, to enable a ratio between a maximum value and a minimum value of the performance status information after the processing to be not greater than the predetermined value; and determine that the display specifications are in a positive proportional relationship with corresponding values of the performance status information after the processing.

In implementations, the determination unit 704 determines the dynamic factor through the following formula:

$$a = \text{Log } 100/\text{Log}(\text{Max}/\text{Min})$$

wherein a is the dynamic factor, Max is the maximum value of the performance state information, and Min is the minimum value of the performance state information.

In implementations, the determination unit 704 is specifically configured to:

determine that the display specifications are in a proportional relationship with corresponding values of the performance state information when the ratio between the maximum value and the minimum value of the performance state information is not greater than the predetermined value.

In implementations, when the graphics are two-dimensional graphics, the display specifications include areas of the two-dimensional graphics; when the graphics are three-dimensional graphics, the display specifications include volumes of the three-dimensional graphics.

In implementations, the performance status information includes: respective numbers of service calls.

In implementations, the display apparatus 700 may further include one or more processors 708, an input/output (I/O) interface 710, a network interface 712, and memory 714.

The memory 714 may include a form of computer readable media such as a volatile memory, a random access memory (RAM) and/or a non-volatile memory, for example, a read-only memory (ROM) or a flash RAM. The memory 714 is an example of a computer readable media. In implementations, the memory 714 may include program units 716 and program data 718. The program units 716 may include one or more units as described in the foregoing description and FIG. 7.

In implementations, the computer readable media may include a volatile or non-volatile type, a removable or non-removable media, which may achieve storage of information using any method or technology. The information may include a computer-readable instruction, a data structure, a program module or other data. Examples of computer storage media include, but not limited to, phase-change memory (PRAM), static random access memory (SRAM), dynamic random access memory (DRAM), other types of random-access memory (RAM), read-only memory (ROM), electronically erasable programmable read-only memory (EEPROM), quick flash memory or other internal storage technology, compact disk read-only memory (CD-ROM), digital versatile disc (DVD) or other optical storage, magnetic cassette tape, magnetic disk storage or other magnetic storage devices, or any other non-transmission media, which may be used to store information that may be accessed by a computing device. As defined herein, the computer readable media does not include transitory media, such as modulated data signals and carrier waves.

Figure 8:
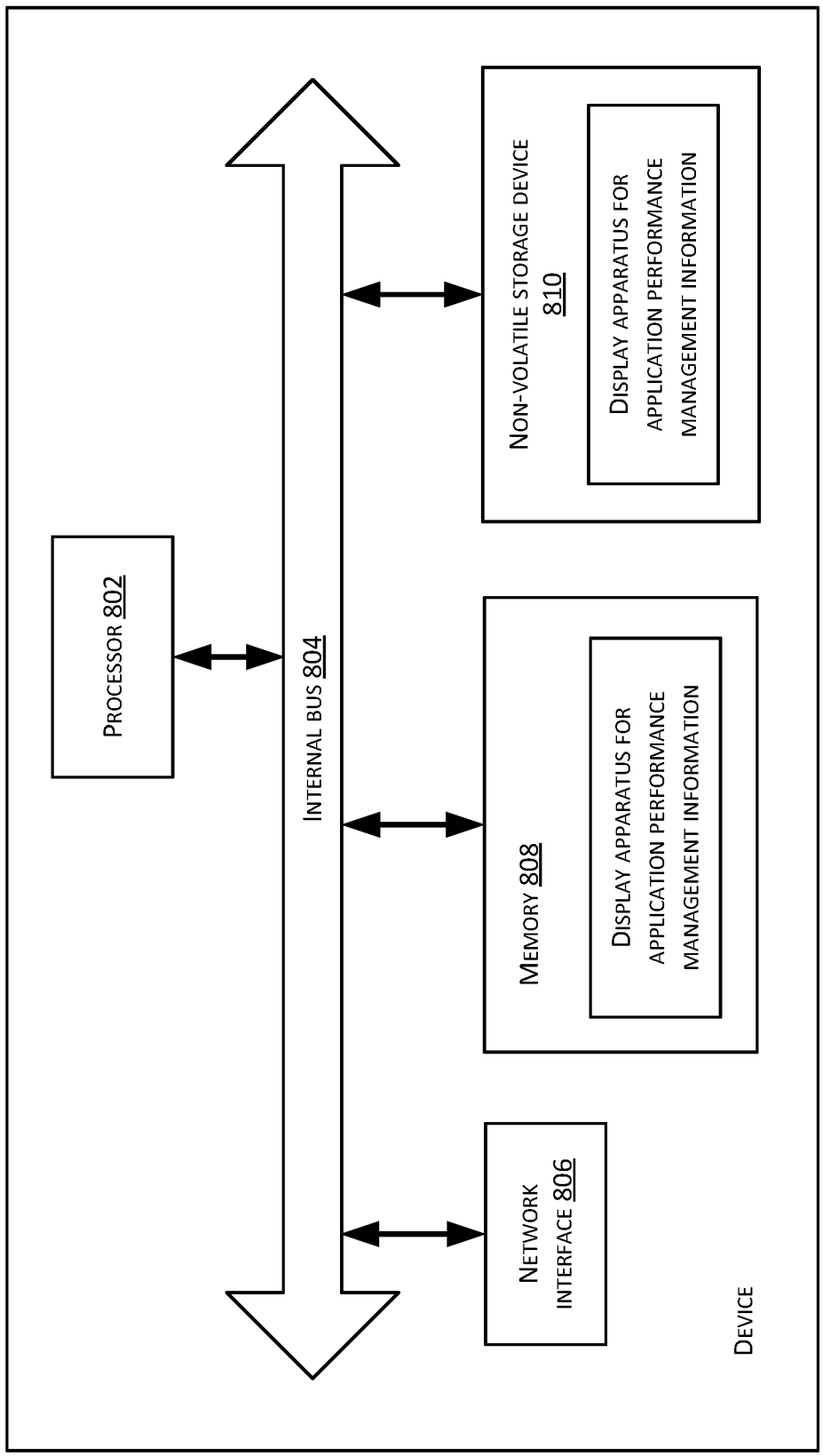
FIG. 8 is a schematic structural diagram of another device provided by an exemplary embodiment.

FIG. 8 is a schematic structural diagram of a device provided by an exemplary embodiment. Referring to FIG. 8, at the hardware level, the device includes a processor 802, an internal bus 804, a network interface 806, a memory 808, and a non-volatile storage device 810. Apparently, hardware needed by other services may also be included. The processor 802 reads a corresponding computer program from the non-volatile storage device 810 to the memory 808, and then runs it to form a display apparatus for application performance management information on a logical level. Apparently, in addition to software implementations, one or more embodiments of the present disclosure do not exclude other implementations, such as logic devices or a combination of software and hardware, etc. In other words, an execution body of the following processing flow is not limited to various logic units, and may also be hardware or a logic device.

Figure 9:
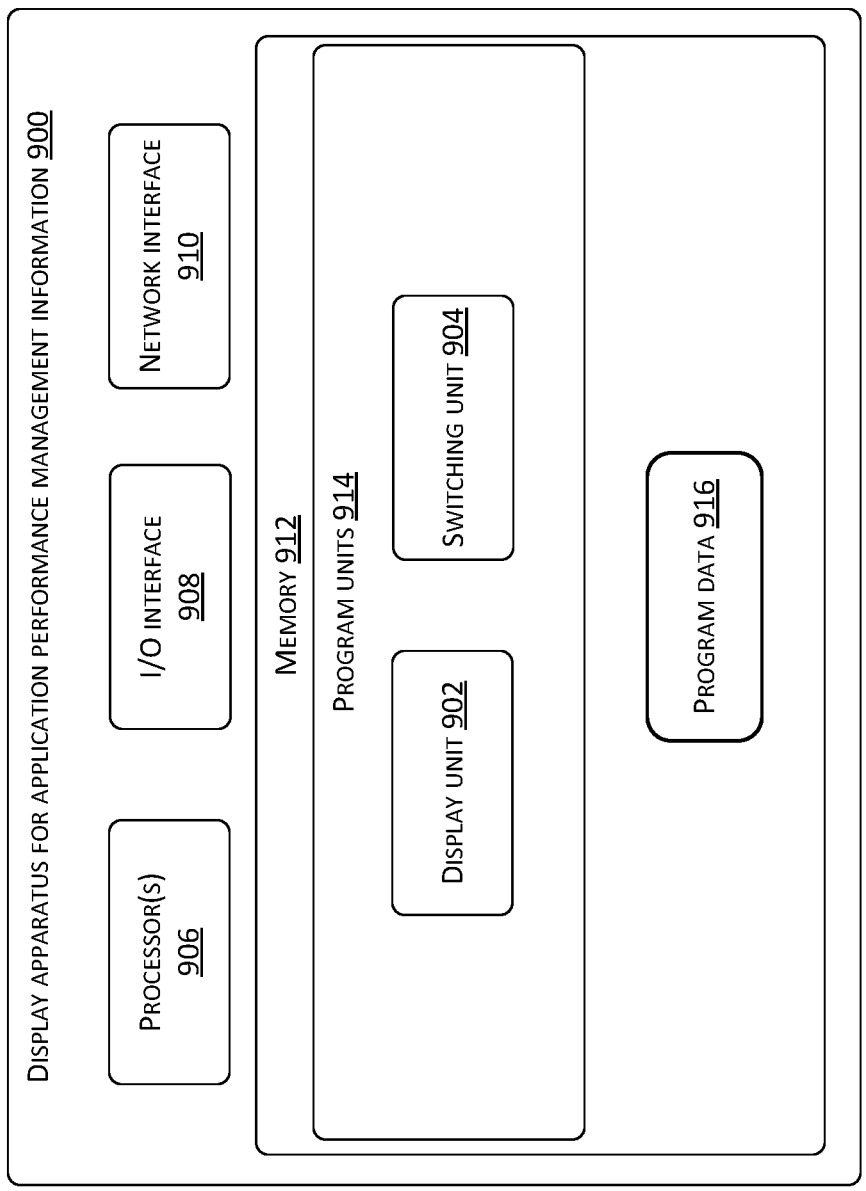
FIG. 9 is a block diagram of another apparatus for displaying application performance management information provided by an exemplary embodiment.

Please refer to FIG. 9, in software implementations, a display apparatus 900 for application performance management information may include:

a display unit 902 that displays a first graphic and a second graphic on a terminal device, the first graphic corresponding to first performance status information of a first application, and the second graphic corresponding to second performance status information of a second application; and a switching unit 904 that switches between a first display mode and a second display mode according to a user's input to adjust an association relationship between first and second display specifications corresponding to the first graphic and the second graphic.

In implementations, the display apparatus 900 may further include one or more processors 906, an input/output (I/O) interface 908, a network interface 910, and memory 912.

The memory 912 may include a form of computer readable media, and is an example of a computer readable media as described in the foregoing description. In implementations, the memory 912 may include program units 914 and program data 916. The program units 914 may include one or more units as described in the foregoing description and FIG. 9.

In implementations, in the first display mode, the first and second display specifications are in a proportional relationship with values of the first and second performance status information; and in the second display mode, exponential reduction processing is performed on the values of the first and second performance status information according to a dynamic factor, so that a ratio between values of the first and second performance status information after the processing is not greater than the predetermined value, and the first and second display specifications have a positive proportional relationship with the values of the first and second performance status information after the processing.

The systems, devices, modules, or units described in the foregoing embodiments may be implemented by computer chips or entities, or implemented by products with certain functions. A typical implementing device is a computer. A specific form of the computer can be a personal computer, a laptop computer, a cellular phone, a camera phone, a smart phone, a personal digital assistant, a media player, a navigation device, an email receiving and sending device, a game control console, a tablet computer, a wearable device, or a combination of any of these devices.

In a typical configuration, a computer includes one or more processors (CPU), input/output interfaces, network interfaces, and memory.

The memory may include a form of computer readable media such as a volatile memory, a random access memory (RAM) and/or a non-volatile memory, for example, a read-only memory (ROM) or a flash RAM. The memory is an example of a computer readable media.

The computer readable media may include a volatile or non-volatile type, a removable or non-removable media, which may achieve storage of information using any method or technology. The information may include a computer-readable instruction, a data structure, a program module or other data. Examples of computer storage media include, but not limited to, phase-change memory (PRAM), static random access memory (SRAM), dynamic random access memory (DRAM), other types of random-access memory (RAM), read-only memory (ROM), electronically erasable programmable read-only memory (EEPROM), quick flash memory or other internal storage technology, compact disk read-only memory (CD-ROM), digital versatile disc (DVD) or other optical storage, magnetic cassette tape, magnetic disk storage or other magnetic storage devices, or any other non-transmission media, which may be used to store information that may be accessed by a computing device. As defined herein, the computer readable media does not include transitory media, such as modulated data signals and carrier waves.

It should also be noted that terms "including", "containing", or any other variants thereof are intended to cover a non-exclusive inclusion, so that a process, method, product or device including a series of elements not only includes these elements, but also includes other elements that are not explicitly listed, or include elements that are inherent to the process, method, product, or device. Without any further limitations, an element defined by a sentence "including a . . . " does not exclude an existence of other identical elements in a process, method, commodity, or device that includes the element.

Exemplary embodiments of the present disclosure are described above. Other embodiments are within the scope of the appended claims. In some cases, actions or steps described in the claims may be performed in an order different from the ones in the embodiments, and still achieve desired results. In addition, a process depicted in a drawing does not necessarily require a specific order or sequential order as shown to achieve a desired result. In certain embodiments, multitasking and parallel processing are also possible or may be advantageous.

Terms used in one or more embodiments of the present disclosure are only intended for describing specific embodiments, and are not intended to limit one or more embodiments of the present disclosure. Singular forms of "a", "said", and "the" that are used in one or more embodiments of the present disclosure and the appended claims are also intended to include plural forms, unless the context clearly indicates other meanings. It should also be understood that a term "and/or" used herein refers to and includes any or all possible combinations of one or more associated items that are listed.

It should be understood that, although terms "first", "second", "third", etc. may be used in one or more embodiments of the present disclosure to describe various types of information, these pieces of information should not be limited to these terms. These terms are only used to distinguish the same type of information from each other. For example, without departing from the scope of one or more embodiments of the present disclosure, first information may also be referred to as second information, and similarly, the second information may also be referred to as first information. Depending on the context, a word "if" as used herein can be interpreted as "when" or "at the time when" or "in response to a determination of".

The above descriptions are only exemplary embodiments of one or more embodiments of the present disclosure, and are not intended to limit one or more embodiments of the present disclosure. All modifications, equivalent replacements, improvements, etc. that are made within the spirit and principles of one or more embodiments of the present disclosure shall be included in the scope of protection of one or more embodiments of the present disclosure.

The present disclosure can further be understood using the following clauses.

Clause 1: A method for displaying application performance management information, comprising: separately obtaining first and second performance status information of services provided by a first application and a second application; determining first and second display specifications of respective graphics corresponding to the first and second performance status information, to enable a ratio of the first display specification to the second display specification to be not greater than a preset value; and displaying the respective graphics corresponding to the first and second performance status information according to the determined first and second display specifications.

Clause 2: The method recited in Clause 1, wherein determining the first and second display specifications of the respective graphics corresponding to the first and second performance status information comprises: performing exponential reduction processing on the values of the first and second performance status information according to a dynamic factor when a ratio between the values of the first and second performance status information is greater than the predetermined value, to enable a ratio between the values of the first and second performance status information after the processing to be not greater than the predetermined value; and determining that the display specifications are in a positive proportional relationship with the values of the first and second performance status information after the processing.

Clause 3: The method as recited in Clause 2, wherein the dynamic factor is determined through the following formula: a=Log b/Log(Max/Min), wherein a is the dynamic factor, b is the preset value, Max is a larger value of the first and second performance state information, and Min is a smaller value of the first and second performance state information.

Clause 4: The method recited in Clause 1, wherein determining the first and second display specifications of the respective graphics corresponding to the first and second performance status information comprises: determining that the first and second display specifications are in a proportional relationship with the values of the first and second performance state information when the ratio between the larger value and the smaller value of the first and second performance state information is not greater than the predetermined value.

Clause 5: The method recited in Clause 1, wherein: when the graphics are two-dimensional graphics, the first and second display specifications comprise areas of the two-dimensional graphics; and when the graphics are three-dimensional graphics, the first and second display specifications include volumes of the three-dimensional graphics.

Clause 6: The method recited in Clause 1, wherein the performance status information comprises: respective numbers of service calls.

Clause 7: A method for displaying application performance management information, comprising: displaying a first graphic and a second graphic on a terminal device, the first graphic corresponding to first performance status information of a first application, and the second graphic corresponding to second performance status information of a second application; and switching between a first display mode and a second display mode according to a user's input to adjust an association relationship between first and second display specifications corresponding to the first graphic and the second graphic.

Clause 8: The method as recited in Clause 7, wherein: in the first display mode, the first and second display specifications are in a proportional relationship with values of the first and second performance status information; and in the second display mode, exponential reduction processing is performed on the values of the first and second performance status information according to a dynamic factor, so that a ratio between values of the first and second performance status information after the processing is not greater than the predetermined value, and the first and second display specifications have a positive proportional relationship with the values of the first and second performance status information after the processing.

Clause 9: A display apparatus for application performance management information, comprising: an acquisition unit that separately obtains first and second performance status information of services provided by a first application and second application; a determination unit that determines display first and second display specifications of graphics corresponding to the first and second performance status information, to cause a ratio between the first display specification and the second display specification to be not greater than a preset value; and a display unit that displays the graphics corresponding to the first and second performance status information according to the determined first and second display specifications.

Clause 10: The apparatus as recited in Clause 9, wherein the determination unit is specifically configured to: perform exponential reduction processing on values of the first and second performance status information according to a dynamic factor when a ratio between the values of the first and second performance status information is greater than a predetermined value, to enable the ratio between the values of the first and second performance status information after the processing to be not greater than the predetermined value; and determine that the first and second display specifications are in a positive proportional relationship with the values of the first and second performance status information after the processing.

Clause 11: The apparatus as recited in Clause 10, wherein the determination unit determines the dynamic factor through the following formula: a=Log b/Log(Max/Min), wherein a is the dynamic factor, b is the preset value, Max is a larger value of the first and second performance state information, and Min is a smaller value of the first and second performance state information.

Clause 12: A display apparatus for application performance management information, comprising: a display unit that displays a first graphic and a second graphic on a terminal device, the first graphic corresponding to first performance status information of a first application, and the second graphic corresponding to second performance status information of a second application; and a switching unit that switches between a first display mode and a second display mode according to a user's input to adjust an association relationship between first and second display specifications corresponding to the first graphic and the second graphic.

Clause 13: The apparatus as recited in Clause 12, wherein: in the first display mode, the first and second display specifications are in a proportional relationship with values of the first and second performance status information; and in the second display mode, exponential reduction processing is performed on the values of the first and second performance status information according to a dynamic factor, to enable a ratio between the values of the first and second performance status information after the processing to be not greater than a predetermined value, and the first and second display specifications to have a positive proportional relationship with the values of the first and second performance status information after the processing.

Clause 14: An electronic device comprising: a processor; a memory used for storing processor executable instructions; wherein the processor implements the method as recited in any one of Clauses 1-6 by running the executable instructions.

Clause 15: An electronic device comprising: a processor; a memory for storing processor executable instructions; wherein the processor implements the method as recited in Clause 7 or 8 by running the executable instruction.

Clause 16: A computer-readable storage medium storing computer instructions, wherein the instructions, when executed by a processor, implement the steps of the method as recited in any one of Clauses 1-6.

Clause 17: A computer-readable storage medium storing computer instructions, wherein the instructions, when executed by a processor, implement the steps of the method as recited in Clause 7 or 8.

What is claimed is:

1. A method implemented by a computing device, the method comprising:
separately obtaining first performance status information and second performance status information of services provided by a first application and a second application;
determining a first display specification and a second display specification of respective graphics corresponding to the first performance status information and the second performance status information, to enable a ratio of the first display specification to the second display specification to be not greater than a predetermined value, wherein determining the first display specification and the second display specification of the respective graphics corresponding to the first performance status information and the second performance status information comprises:
performing exponential reduction processing on values of the first performance status information and the second performance status information according to a dynamic factor when a ratio between the values of the first performance status information and the second performance status information is greater than the predetermined value, to enable, after the exponential reduction processing is performed, a new ratio between the values of the first performance status information and the second performance status information to be not greater than the predetermined value; and
displaying the respective graphics corresponding to the first performance status information and the second performance status information according to the first display specification and the second display specification, wherein:
the first display specification includes a size and a color of a first graphic, the first graphic corresponding to the first performance status information of the first application,
the size of the first graphic corresponds to a number of service calls received by the first application,
the color of the first graphic indicates a health condition of the first application, and when the respective graphics are two-dimensional graphics, the first display specification and the second display specification comprise areas of the two-dimensional graphics.

2. The method as recited in claim 1, wherein determining the first display specification and the second display specification of the respective graphics corresponding to the first performance status information and the second performance status information further comprises:

determining, after the exponential reduction processing is performed, that the first display specification and the second display specification are in a positive proportional relationship with the values of the first performance status information and the second performance status information.

3. The method as recited in claim 1, wherein the dynamic factor is obtained based at least in part on a logarithmic operation of a ratio between a larger value and a smaller value of the first performance status information and the second performance status information.

4. The method recited in claim 1, wherein determining the first display specification and the second display specification of the respective graphics corresponding to the first performance status information and the second performance status information further comprises:

determining that the first display specification and the second display specification are in a proportional relationship with the values of the first performance status information and the second performance status information when a ratio between a larger value and a smaller value of the first performance status information and the second performance status information is not greater than the predetermined value.

5. The method recited in claim 1, wherein: when the respective graphics are three-dimensional graphics, the first display specification and the second display specification include volumes of the three-dimensional graphics.

6. The method recited in claim 1, wherein the first performance status information and the second performance status information comprises: respective numbers of service calls.

7. One or more computer readable media storing executable instructions that, when executed by one or more processors, cause the one or more processors to perform acts comprising:

separately obtaining first performance status information and second performance status information of services provided by a first application and a second application;

determining a first display specification and a second display specification of respective graphics corresponding to the first performance status information and the second performance status information, to enable a ratio of the first display specification to the second display specification to be not greater than a predetermined value, wherein determining the first display specification and the second display specification of the respective graphics corresponding to the first performance status information and the second performance status information comprises:

performing exponential reduction processing on values of the first performance status information and the second performance status information according to a dynamic factor when a ratio between the values of the first performance status information and the second performance status information is greater than the predetermined value, to enable, after the exponential reduction processing is performed, a new ratio between the values of the first performance status information and the second performance status information to be not greater than the predetermined value; and displaying the respective graphics corresponding to the first performance status information and the second performance status information according to the first display specification and the second display specification, wherein:

the first display specification includes a size and a color of a first graphic, the first graphic corresponding to the first performance status information of the first application, the size of the first graphic corresponds to a number of service calls received by the first application, the color of the first graphic indicates a health condition of the first application, and when the respective graphics are two-dimensional graphics, the first display specification and the second display specification comprise areas of the two-dimensional graphics.

8. The one or more computer readable media as recited in claim 7, wherein determining the first display specification and the second display specification of the respective graphics corresponding to the first performance status information and the second performance status information further comprises:

determining, after the exponential reduction processing is performed, that the first display specification and the second display specification are in a positive proportional relationship with the values of the first performance status information and the second performance status information.

9. The one or more computer readable media as recited in claim 7, wherein the dynamic factor is obtained based at least in part on a logarithmic operation of a ratio between a larger value and a smaller value of the first performance status information and the second performance status information.

10. The one or more computer readable media recited in claim 7, wherein determining the first display specification and the second display specification of the respective graphics corresponding to the first performance status information and the second performance status information further comprises:

determining that the first display specification and the second display specification are in a proportional relationship with the values of the first performance status information and the second performance status information when a ratio between a larger value and a smaller value of the first performance status information and the second performance status information is not greater than the predetermined value.

11. The one or more computer readable media recited in claim 7, wherein: when the respective graphics are three-dimensional graphics, the first display specification and the second display specification include volumes of the three-dimensional graphics.

12. The one or more computer readable media recited in claim 7, wherein the first performance status information and the second performance status information comprises: respective numbers of service calls.

13. An apparatus, comprising:
one or more processors;
memory;
a display unit stored in the memory and executed by the one or more processors to:

display a first graphic and a second graphic on a terminal device, the first graphic corresponding to first performance status information of a first application, and the second graphic corresponding to second performance status information of a second application; and a switching unit stored in the memory and executed by the one or more processors to switch between a first display mode and a second display mode according to a user's input to adjust an association relationship between a first display specification and a second display specification corresponding to the first graphic and the second graphic, wherein:

the first display specification and the second display specification is adjusted by performing exponential reduction processing on values of the first performance status information and the second performance status information according to a dynamic factor when a ratio between the values of the first performance status information and the second performance status information is greater than a predetermined value, to enable, after the exponential reduction processing is performed, a new ratio between the values of the first performance status information and the second performance status information to be not greater than the predetermined value, the first display specification includes a size and a color of the first graphic, and the size of the first graphic corresponds to a number of service calls received by the first application, the size being larger when the number of service calls is larger, and the color of the first graphic indicates a health condition of the first application, and when the first graphic and the second graphic are two-dimensional graphics, the first display specification and the second display specification comprise areas of the two-dimensional graphics.

14. The apparatus as recited in claim 13, wherein:
in the first display mode, the first display specification and the second display specification are in a proportional relationship with the values of the first performance status information and the second performance status information.

15. The apparatus as recited in claim 13, wherein:
the first display specification and the second display specification, after the exponential reduction processing is performed, to have a positive proportional relationship with the values of the first performance status information and the second performance status information.

16. The apparatus as recited in claim 13, wherein: the first performance status information comprises at least one of the number of service calls, a number of errors, and an average duration for each call.

* * * * *